(12) United States Patent
Routhier

(10) Patent No.: US 7,848,635 B2
(45) Date of Patent: Dec. 7, 2010

(54) MODULAR STEREOSCOPIC RIG

(75) Inventor: Pierre-Hugues Routhier, Varennes (CA)

(73) Assignee: Creat3 Inc., Varennes, Quebec (CA)

( * ) Notice: Subject to any disclaimer, the term of this patent is extended or adjusted under 35 U.S.C. 154(b) by 238 days.

(21) Appl. No.: 12/128,448

(22) Filed: May 28, 2008

(65) Prior Publication Data

US 2009/0296212 A1 Dec. 3, 2009

(51) Int. Cl.
*G03B 35/08* (2006.01)
(52) U.S. Cl. .......................... 396/325; 396/428; 348/47
(58) Field of Classification Search ................. 396/325, 396/327; 348/47
See application file for complete search history.

(56) References Cited

U.S. PATENT DOCUMENTS

| | | | | |
|---|---|---|---|---|
| 2,545,465 | A * | 3/1951 | Hough | 396/325 |
| 3,251,284 | A * | 5/1966 | Ratliff, Jr. | 396/327 |
| 7,654,425 | B2 * | 2/2010 | Huang et al. | 224/483 |
| 2006/0204240 | A1 * | 9/2006 | Cameron et al. | 396/325 |
| 2008/0117290 | A1 * | 5/2008 | Mazza | 348/47 |

FOREIGN PATENT DOCUMENTS

| | | | |
|---|---|---|---|
| JP | 07234461 | A * | 9/1995 |
| JP | 2005024629 | A * | 1/2005 |

OTHER PUBLICATIONS

Inition ProStereoMount product web page (Archive.org dated Nov. 10, 2007).*
Inition ProStereoMount product web page (Archive.org dated Jun. 17, 2006).*
Kaidan QuickTilt leveler product website (Archive.org dated Dec. 28, 2005).*

* cited by examiner

*Primary Examiner*—W. B. Perkey
*Assistant Examiner*—Leon W. Rhodes
(74) *Attorney, Agent, or Firm*—Alexandre Abecassis; Fasken Martineau DuMoulin LLP

(57) ABSTRACT

The present invention relates to a rig for a stereoscopic camera system. More specifically, the present invention pertains to a modular stereoscopic rig system. The modular rig system comprises a plurality of interchangeable bases, a first camera mounting module for mounting a first camera to one base and a second camera mounting module for mounting a second camera to the same base.

8 Claims, 12 Drawing Sheets

MODULAR STEREOSCOPIC RIG

FIELD OF THE INVENTION

The present invention generally relates to a rig. More specifically, the present invention relates to a modular stereoscopic rig.

BACKGROUND OF THE INVENTION

Current professional stereoscopic rigs are complex devices, integrating electro-mechanical, optical and electronic components. Since they are built from numerous components and that such components involve most of the time electronic devices, rigs of the prior art tend to be relatively fragile, especially in outdoors conditions. Therefore, use of these rigs outside of controlled environments, for instance during bad whether conditions, tend to be limited since damages may occur. These rigs thus tend to be unsatisfactorily reliable and their use not particularly flexible to various setups.

Because they involve such a number of components, rigs are most of the time built unitarily (i.e. one at a time) and are configured for receiving specific cameras and lenses. Further, rigs are usually quite heavy, large and complex to operate. As such when different stereoscopic settings are required (e.g. macro-stereoscopy, normal stereoscopy or hyper-stereoscopy), different rigs must be used, which multiplies the weight, size, cost and reliability issues for the production, which limits their application and drastically increases their operating costs when compared to 2D cameras.

It would thus be advantageous to be provided with a stereoscopic rig system which is mechanically simple, easy to operate and flexible.

SUMMARY OF THE INVENTION

In order to address the above and other drawbacks, and in accordance with the present invention, there is disclosed a modular stereoscopic rig system.

In accordance with one embodiment, the modular stereoscopic rig system comprises a first module for mounting a first camera thereto, the first module comprising a first corresponding coupling means. The system also comprises a second module for mounting a second camera thereto, the second module comprising a second corresponding coupling means and a convergence angle adjusting means. Also comprised in the system is a plurality of interchangeable bases, each of the interchangeable bases comprising a first end, a second opposed end and a base coupling means. The base coupling means is provided on the base between the first and second ends and collaborates with the first and the second coupling means for removably mounting the first module and the second module to the interchangeable bases.

In this embodiment, the coupling means enables adjustable positioning of the first and second modules relative to the first and second ends of the interchangeable bases and the convergence angle adjusting means enables adjustment of a convergence angle between the first and second cameras mounted to the first and second modules.

According to one aspect, at least one of the first module and the second module comprises a base mounting member provided with a coupling means adapted to engage the base mounting means of the base; a tilt adjusting means mounted on the base mounting member and a camera coupling member. The camera coupling member is mounted on the tilt adjusting means, which tilt adjusting means enables tilt adjustment of the camera coupling member relative to the base mounting member.

According to another aspect, the tilt adjusting means comprises a three-point adjustment screw system.

According to a further aspect, the modular stereoscopic rig system also comprises a second convergence angle adjusting means, the second convergence angle adjusting means being operatively coupled to the first module.

In accordance with another embodiment, there is provided a modular rig for a stereoscopic camera system. The modular rig comprises a base comprising a first end, a second opposed end and a base coupling means. The modular rig also comprises a first module for mounting a first camera thereto and a second module for mounting a second camera thereto. The first module comprising a first coupling means engaging the base coupling means for mounting the first module to the base. The second module comprises a second coupling means and a convergence angle adjusting means. The second coupling means engages the base coupling means for mounting the second module to the base. The base coupling means enables adjustable positioning of the first and second modules relative to the first and second ends of the base, while the convergence angle adjusting means enables adjustment of a convergence angle between the first and second cameras mounted to the first and second modules.

According to one aspect, the tilt adjusting means comprises a three-point adjustment screw system.

According to another aspect, the modular rig further comprises a second convergence angle adjusting means, operatively coupled to the first module.

According to yet another embodiment, there is provided a base for a modular stereoscopic camera rig. The base comprises a frame having a first end and a second opposed end. The base also comprises a base coupling means provided on the frame for mounting first and second modules to the base, where the first and second modules are configured to engage the base coupling means. The base coupling means enables adjustable positioning of the first and second modules relative to the first and second ends of the base.

In a further embodiment, a camera mounting module for a modular stereoscopic camera rig is provided. The camera mounting module comprises a base mounting member comprising a coupling means adapted to engage a complementary base mounting means on a rig base for mounting the module to the base. The camera mounting module also comprises a tilt adjusting means mounted on the base mounting member and a camera coupling member. The camera coupling member is mounted on the tilt adjusting means, the tilt adjusting means enabling tilt adjustment of the camera coupling member relative to the base mounting member.

These and other objects, advantages and features of the present invention will become more apparent to those skilled in the art upon reading the details of the invention more fully set forth below.

BRIEF DESCRIPTION OF THE DRAWINGS

Having thus generally described the nature of the invention, reference will now be made to the accompanying drawings, showing by way of illustration an illustrative embodiment thereof, and in which.

DESCRIPTION OF THE ILLUSTRATIVE EMBODIMENTS

Figure 1:
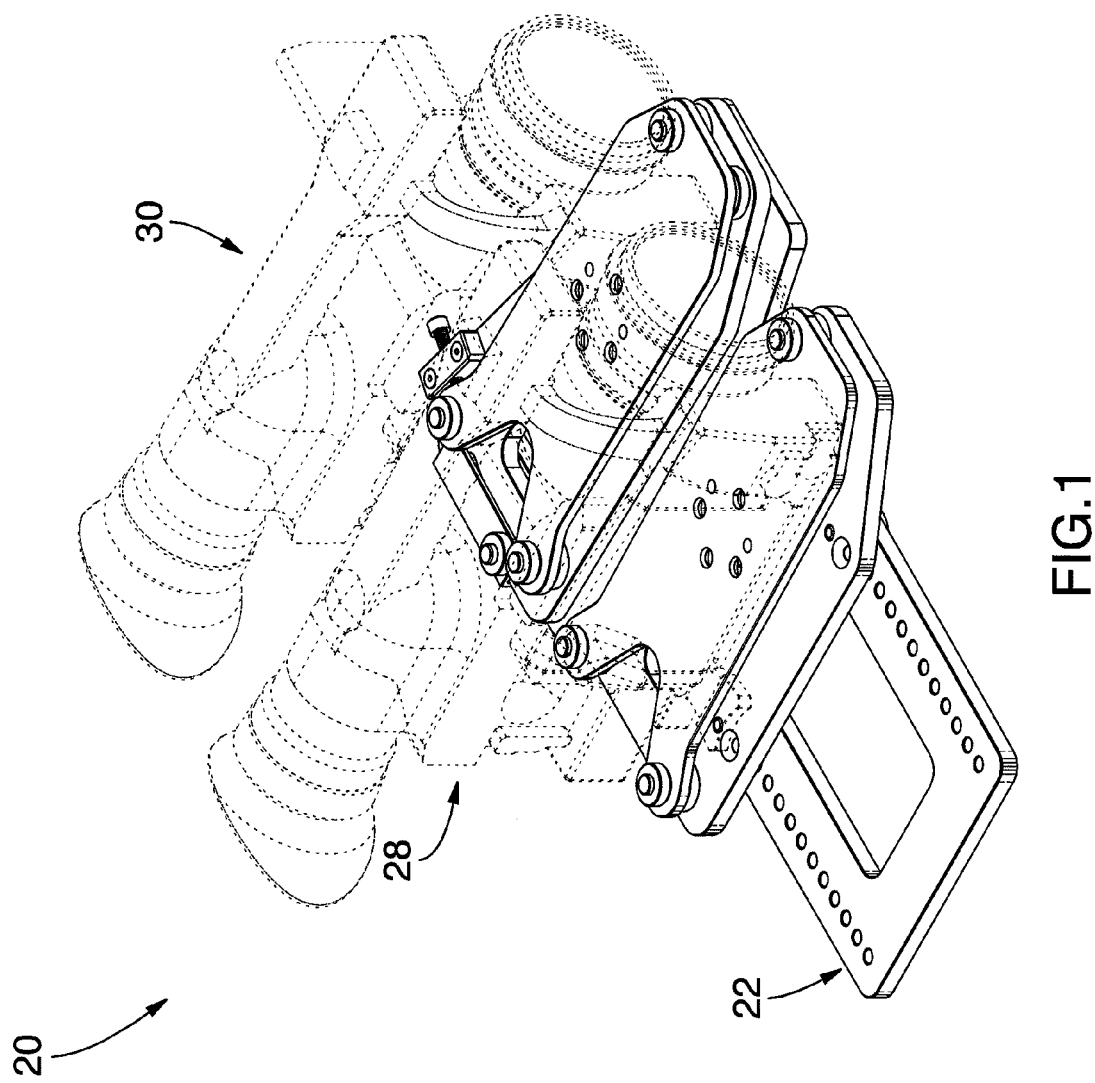
FIG. 1 is a front left perspective view of a modular stereoscopic rig in accordance with one embodiment of the present invention, with a pair of cameras mounted thereto.
Figure 2:
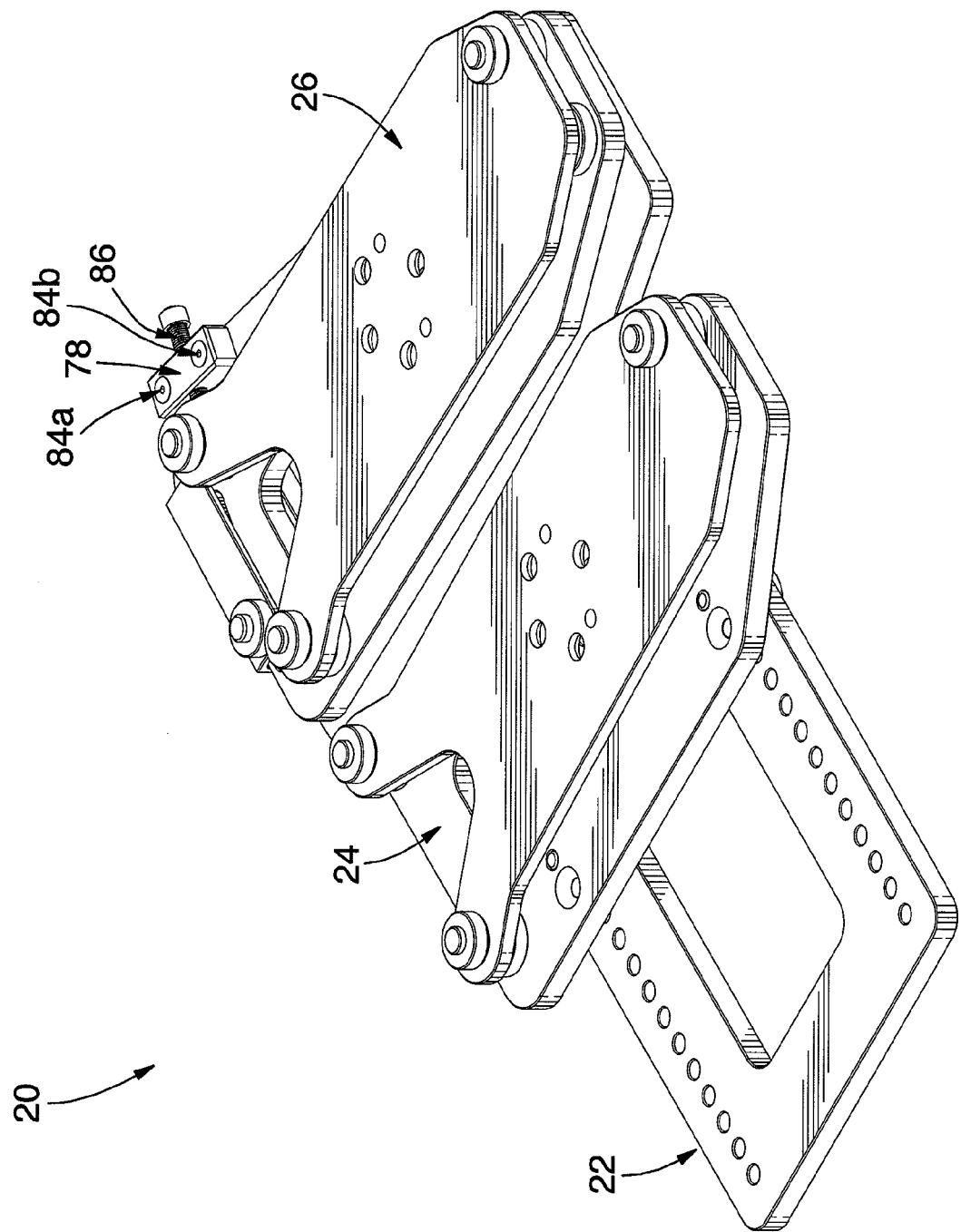
FIG. 2 is another front left perspective view of the modular stereoscopic rig shown in FIG. 1, with the camera removed.

The description which follows, and the embodiments described therein are provided by way of illustration of an example, or examples of particular embodiments of principles and aspects of the present invention. These examples are provided for the purpose of explanation and not of limitation, of those principles of the invention. In the description that follows, like parts are marked throughout the specification and the drawings with the same respective reference numerals.

With reference to FIGS. 1 to 4, a modular, stereoscopic rig system according to one embodiment of the present invention is described using the reference numeral 20. The rig system 20 comprises a base 22, a first, left camera mounting module 24 removably mounted on the base 22 and a second camera mounting module 26, also removably mounted on the base 22. As best shown in FIG. 1, the first and second camera mounting modules 24 and 26 are configured for receiving thereon first and second cameras 28 and 30, respectively. As it will become apparent below, the base 22 and the first and second modules 24 and 26 are configured to enable adjustment of the distance between the first and second modules 24, 26 or, in other words, the interaxial distance between the first and second cameras 38 and 30.

According to one embodiment, the base 22 is a base for stereoscopic shots where the distance between the cameras varies between 4 and 10 inches. In cinema, this translates to "long" shots (e.g. 20 to 60 feet from subject), and in High-Definition Television (HDTV) it translates to "medium" shots (10 to 25 feet from subject). More precisely, the base 22 comprises a monolithic plate 32 comprising a first, left end 34, a second right end 36, a top face 38 and a bottom face 40. The plate 32 defines a rectangular left portion 42 (when seen from the front as in FIG. 4), extending from the left end 34 to an intermediate region 44, and a trapezoidal right portion 46 extending between the intermediate region 44 and the right end 36 of the plate 32.

The left portion 42 of the plate comprises a back edge 48, a front edge 50, a back row of holes 52 and a front row of holes 54. In one embodiment, the back row 52 comprises nineteen (19) circular holes 56a-56s distributed along the back edge 48, between the left end 34 of the plate 32 and the intermediate region 44. Similarly, the front row 54 comprises nineteen (19) holes 58a-58s distributed along the front edge 50 of the left portion 42, between the left end 34 of the plate 32 and the intermediate region 44. In this embodiment, the holes of the back row 52 are aligned with the corresponding holes of the front row 54 (e.g. hole 56a of the back row 52 is aligned with hole 58a of the front row 54. A person skilled in the art will appreciate that the base 22 may be provided with a different number of holes in each row 52, 54. The holes 56a-56s and 58a-58s are configured for enabling interaxial settings of the first module 24 on the base. The holes 56a-56s and 58a-58s are spaced no further than a quarter-inch in this embodiment, which allows for a more precise interaxial adjustment. It will be appreciated that holes (e.g. holes 56a-56s and 58a-58s) were selected instead of continuous grooves, to ensure the camera module above stays perfectly perpendicular to the base 22, thereby facilitating further adjustment of the convergence angle.

As it will become apparent below, the holes 56a-56s and 58a-58s extend between the top and bottom faces 38, 40 of the plate 32 and are adapted for receiving therein mating portions of the first, left camera mounting module 24.

Provided between the back and front rows 52, 54 is a rectangular void or opening 60. The opening 60 is aimed at reducing the overall weight of the base 22 for facilitating transport, installation and operation of the rig 20. It will indeed be appreciated by a person skilled in the art that lower weight rigs can use lighter camera support and allow for faster and more fluid movement of the cameras mounted thereto.

The right portion 46 of the plate 32 protrudes backwardly and frontwardly from the left portion 42 and comprises a left end 62, a right edge 64, a back edge 66 and a front edge 68.

Figure 4:
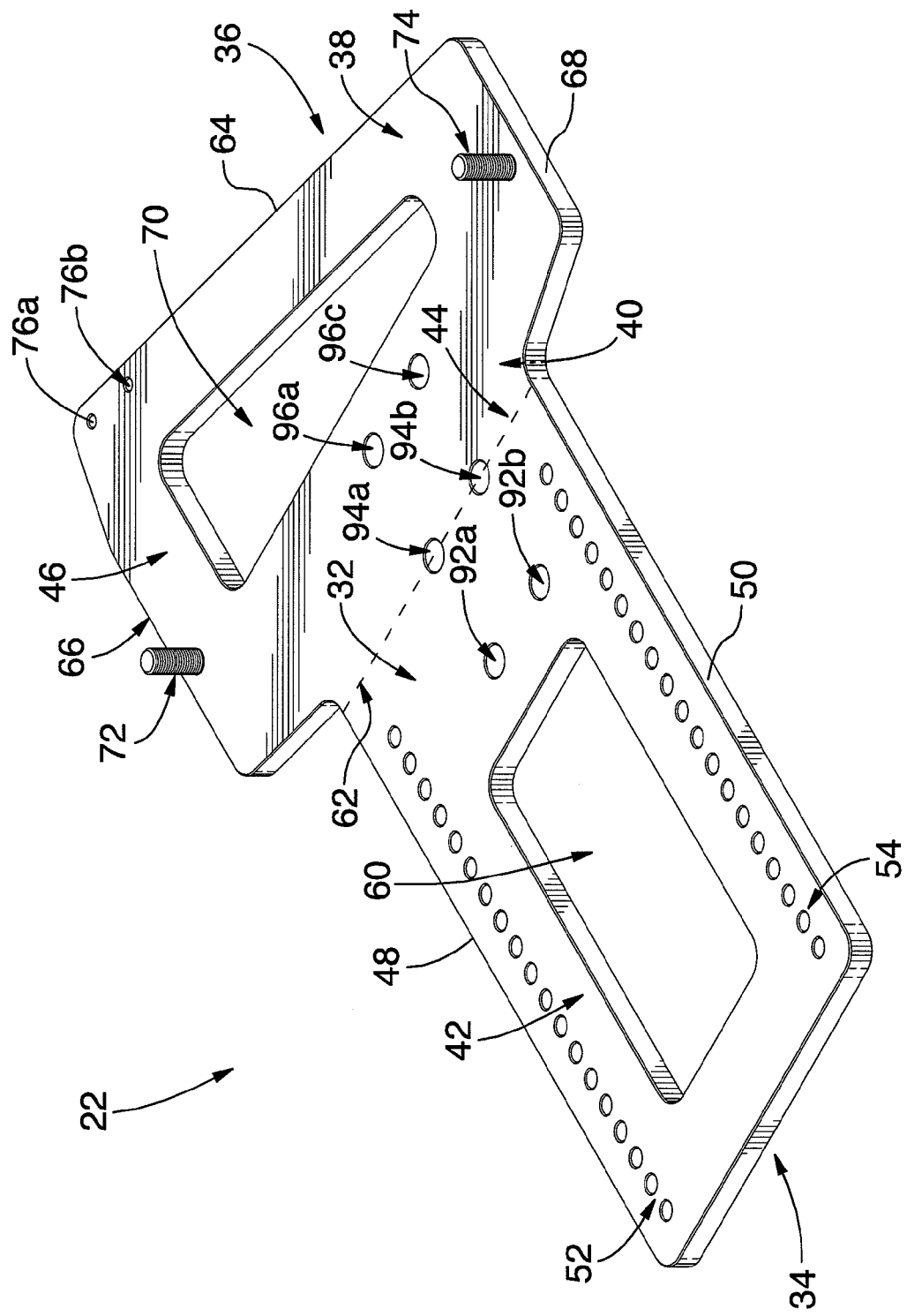
FIG. 4 is a front left perspective view of the base of the modular stereoscopic rig shown in FIG. 1.

Similarly to the left portion 42, the right portion 46 is provided with a void or opening 70 aimed at reducing the overall weight of the base 22. As best shown in FIG. 4, the opening has a generally triangular shape.

Proximal to the back edge 66 thereof, the right portion 46 is provided with a back adjustment pin 72 extending frontwardly from the top face 38 of the plate 32. A front pivot pin 74 is also provided on the right portion 46, proximal to the front edge 68, which pivot pin 74 extends frontwardly from the top face 38. It will become apparent below, the back and front pins 72, 74 are configured for engaging the second, right module 26, for mounting the second camera 30 to the base 22. On the back right corner of the right portion 46 (i.e. proximal to the junction of the back edge 66 and the right edge 64), the plate 32 is provided with a pair of threaded convergence holes 76a, 76b.

Figure 12:
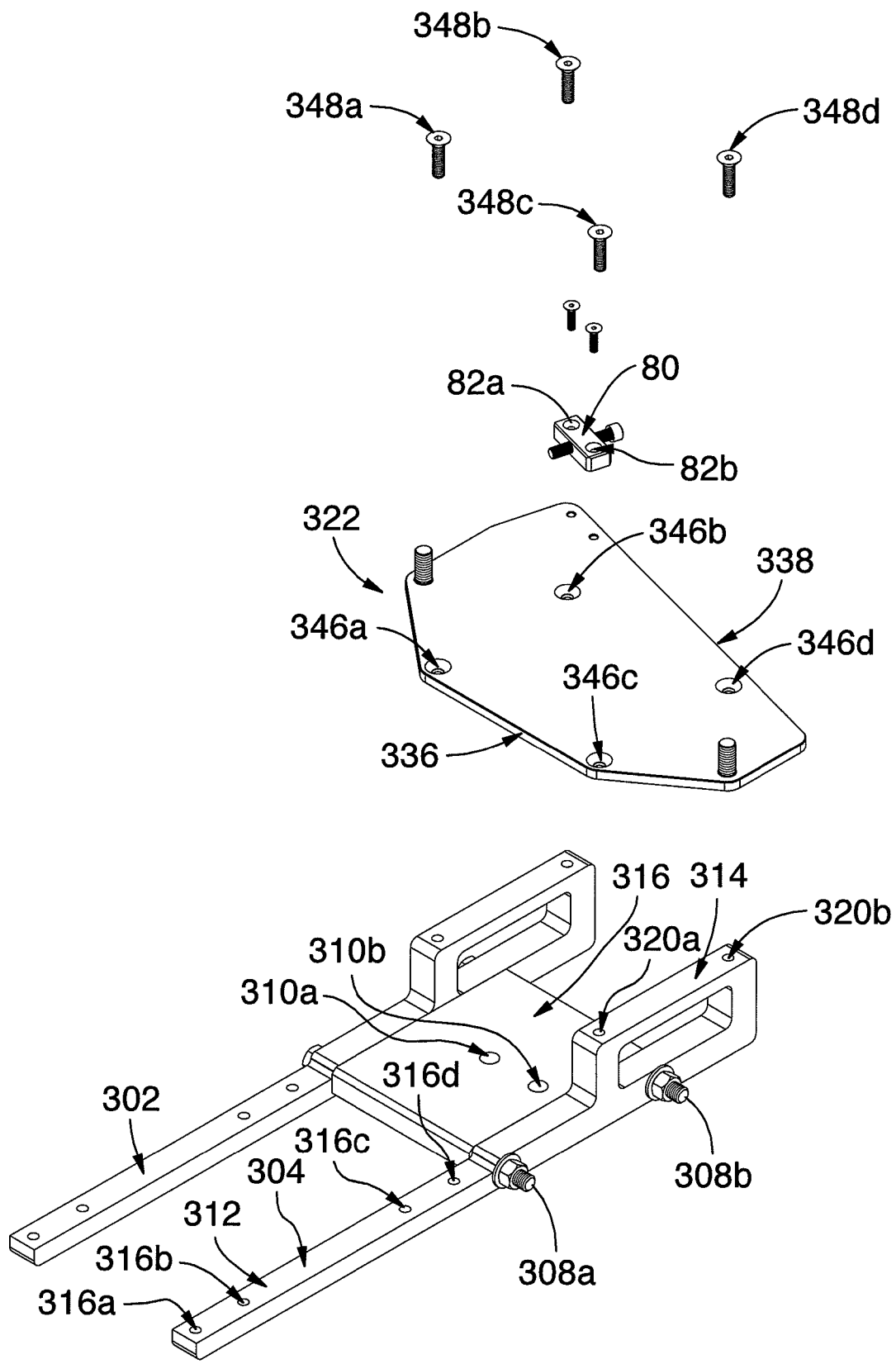
FIG. 12 is a front left perspective view of a base in accordance with a further embodiment of the present invention, with the mounting plate in exploded view.

The threaded convergence holes 76a, 76b are adapted for mounting a convergence adjustor 78 to the base 22, for allowing adjustment of the convergence angle between the first and second cameras 28, 30. In one embodiment, the convergence adjustor 78 comprises a block of a solid material 80, the block 80 being provided with a pair of vertical holes 82a, 82b (best shown in FIG. 12). The holes 82a, 82b of the block 80 are alignable with the threaded holes 76a, 76b of the base 22, thereby enabling mounting the block 80 to the base 22 using a pair of threaded fasteners 84a, 84b.

The block 80 is further provided with a horizontal threaded hole (not shown), extending between the two holes 82a, 82b, in which is screwably mounted a bolt 86. The bolt 86 has a left end 88 contacting the right module 26, and a right end 90 provided with a head (shown in FIG. 6). In this embodiment, screwing and unscrewing the bolt 86 permits to modify the portion of the bolt protruding from each side of the block 80 and thus, to adjust the convergence angle, as best described below. It will be appreciated that using holes to mount the other camera instead of using grooves, is of great advantage. As the camera preserves a perpendicular position relative to the base 22, the convergence angle can be set on the right camera 30 and maintained even if the left camera 28 is displaced or detached to modify the interaxial. More specifically, when the left camera 28 is reattached to the base 22, the angle of convergence between the cameras 28, 30 is still the same, as the left module 24 is still perpendicular. As a person skilled in the art would appreciate that using grooves instead of holes (e.g. holes 56a-56a and 58a-58s) would involve readjustment of the convergence angle every time the interaxial is modified.

For mounting the base 22 to a supporting member such as, for instance, a tripod (not shown), the plate 32 is provided with three pairs of base supporting holes 92a, 92b; 94a, 94b; 96a, 96b (shown in FIG. 4). The three pairs of holes 92a-96b are distributed between the opening 60 of the left portion 42 and the opening 70 of the right portion 46. The base supporting holes 92a-96b of each pair are aligned on one another (e.g. 92a and 92b) and are adapted for receiving therein a mating portion of the supporting members or of an adjustment plate capable of mating with different types of camera supports.

The configuration of the holes 92a-96b is adapted for allowing adjustable mounting of the base 22 to the support member (not shown), for preserving the balance of the rig 20 while the left and right modules 24, 26 are moved between the left and right ends 34, 36 of the base 22, as it will become apparent below. In an alternative embodiment, the base 22 may be provided with handles (not shown), for instance handles extending on each side of the base 22, to facilitate transport of the rig 20 between two shooting locations. Such handles protruding from the base 22 would also contribute to minimize the risk of the operators contacting the rig 20 and the cameras 28, 30 attached thereto and lose adjustment (i.e. interaxial, tilt, convergence).

Figure 5:
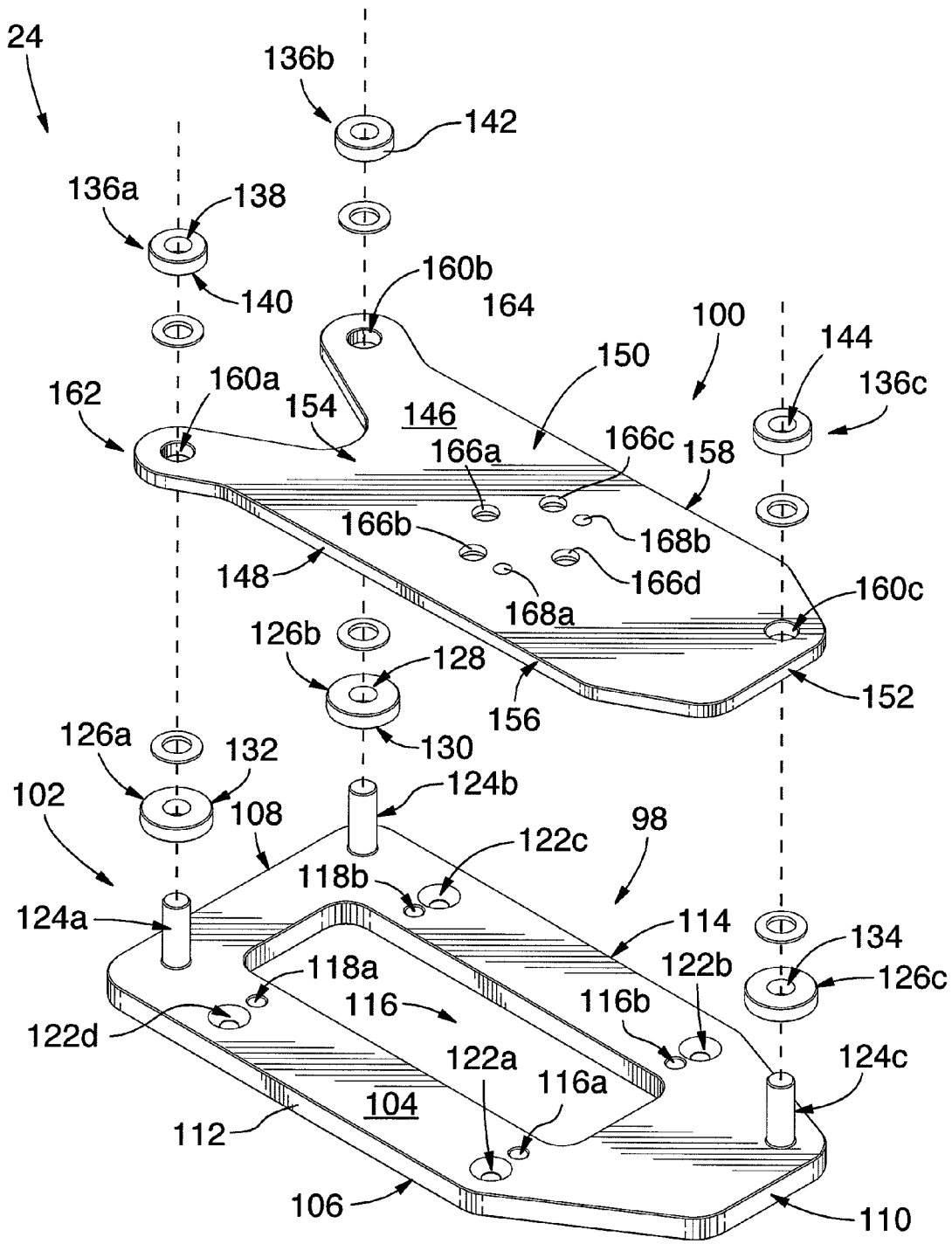
FIG. 5 is an exploded view of a first, left module in accordance with one embodiment of the present invention.

Now turning to FIG. 5, the left module 24 will be described. The left module 24 comprises a lower plate 98 and an upper plate 100 mounted to the lower plate via a tilt adjustment mechanism.

The lower plate 98 comprises a top face 104, a bottom face 106, a back edge 108, a front edge 110 and a pair of side edges 112, 114 extending therebetween. The side edges each comprise a straight portion and an angled portion, the angle portions converging toward one another to connect the front edge 110. The lower plate 98 is provided with a rectangular opening 116 aimed at reducing the weight of the module 24, and comprises a pair of front mounting holes 116a-116b and a pair of back mounting holes 118a-118b. The back mounting holes 118a-118b are preferably threaded and are adapted to be aligned with corresponding holes 56a-56s of the back row 52 of the base 22. Similarly, the front mounting holes 116a-116b are threaded holes, and are configured to be aligned with corresponding holes 58a-58b of the front row 54 of the base 22. As it will become apparent below, this configuration enables removably mounting the left module 24 to the base 22 using threaded fasteners 120a-120d.

Mounted on the top face 104 of the lower plate 98 is the tilt mechanism 102. In one embodiment, the tilt mechanism comprises a three (3) point adjustment screw system. In this embodiment, the tilt mechanism comprises three (3) threaded rods 124a-124c extending upwardly from the top face 104 of the lower plate 98. The first and second rods 124a-124b are positioned proximal to the back edge 108 of the lower plate 98, at the junction of the side edges 112, 114 respectively. The other rod 124c is located proximal to the front edge 110, at the junction of the side edge 114.

The tilt mechanism 102 further comprises a set of adjusting wheels 126a-126c, each adjusting wheel 126a-126c being adjustably mounted on a corresponding threaded rod 124a-124c. Each adjusting wheel 126a-126c comprises top and bottom, flat annular faces 128, 130, a peripheral edge 132 adjusting and a threaded hole 134 extending between the top and bottom faces 128, 130 for engaging the threads of the corresponding rod 124a-124c. The peripheral edge 132 may comprise ridges (not shown) extending radially therefrom for providing enhanced grip of a user over the wheel 126a-126c, thereby facilitating adjustment thereof. In one embodiment, the position of the adjusting wheels 126a-126c on the threaded rods 124a-124c can be adjusted. In this embodiment, rotating a wheel 126a-126c in one direction (e.g. clockwise) will cause the wheel 126a-126c to travel downwardly on the threaded rod 124a-124c, while rotating the wheel 126a-126c countersense (e.g. counterclockwise) will cause the wheel 126a-126c to travel upwardly.

In another embodiment, the tilt mechanism 102 further comprises a set of lock wheels 136a-136c, each lock wheel 136a-136c being mounted on a corresponding threaded rod 124a-124c, above the corresponding adjusting wheels 126a-126c. Similarly to the adjusting wheels 126a-126c, each lock wheel 136a-136c comprises top and bottom, flat annular faces 138, 140, a peripheral edge 142 adjusting and a threaded hole 144 extending between the top and bottom faces 138, 140 for engaging the threads of the corresponding rod 124a-124c. The peripheral edge 142 may also comprise ridges (not shown) extending radially therefrom for providing enhanced grip of a user over the wheel 136a-136c, thereby facilitating adjustment thereof. Similarly to the adjusting wheels 126a-126c, the position of the lock wheels 136a-136c on the threaded rods 124a-124c can be adjusted, where lowering down the lock wheels 136a-136c on the upper plate 100 locks the tilt mechanism 102.

Figure 3:
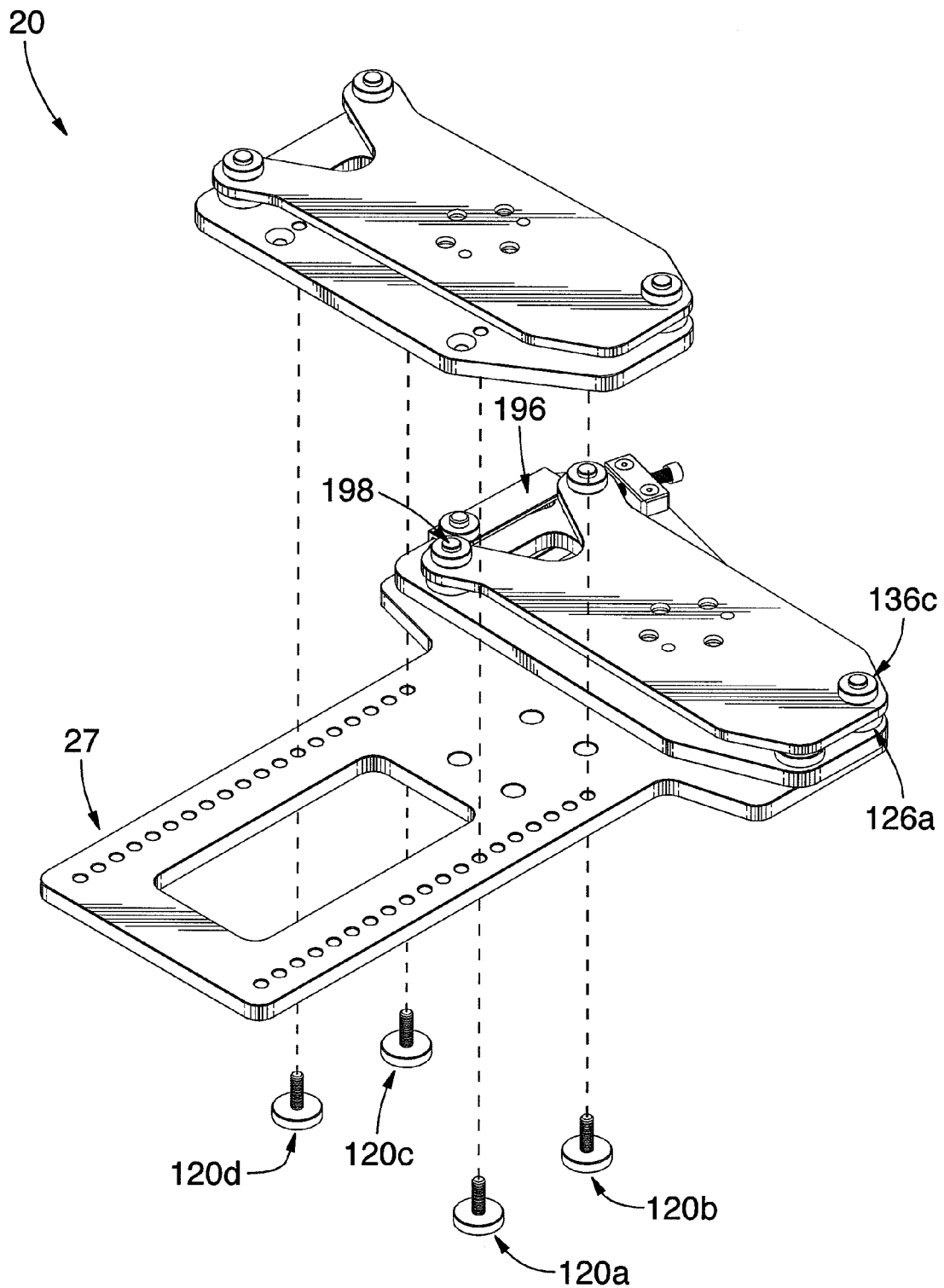
FIG. 3 is yet another front left perspective view of the modular stereoscopic rig shown in FIG. 1, with the first, left module removed for clarity.

The upper plate 100 is mounted on the tilt mechanism 102, sandwiched between the adjusting wheels 126a-126c and the lock wheels 136a-136c (best shown in FIG. 3). The upper plate 100 comprises a top face 146, a bottom face 148, a main body 150 having a front edge 152, a back end 154 and side edges 156, 158. Defined proximal to the junction of the front edge 152 and the right edge 158 is a circular hole 160c adapted for receiving the rod 124c of the tilt mechanism 102, as best described below. The upper plate 100 further comprises a pair of legs 162, 164 extending backwardly from the back end 154 of the main body 150. On each leg 162, 164 is defined a circular hole 160a, 160b extending between the top and bottom faces 146, 148 for receiving therein corresponding rods 124a-124c of the tilt mechanism 102.

Defined at the center of the main body 150 and extending between the top and bottom faces 146, 148 is a plurality of threaded holes 166a-166d and 168a-168b for securing the camera 28 to the upper plate 100, as it will become apparent below.

The upper plate 100 is mounted to the lower plate 98 via the tilt mechanism 102. For mounting the upper plate 100 to the tilt mechanism 102, the lock wheels 136a-136c are removed from the threaded rods 124a-124c and the adjusting wheels 126a-126c lowered on the rods 124a-124c (e.g. until the bottom faces 130 thereof adjoin the top face 104 of the lower plate 98). The upper plate 100 is then positioned on the tilt mechanism 102, the holes 160a-160c receiving therethrough the threaded rods 124a-124c, respectively, the bottom face 148 thereof resting on the top face 128 of the adjusting wheels 126a-126c. The lock wheels 136a-136c are then secured onto the corresponding rods 124a-124c, the bottom face 140 thereof lying against the top face 146 of the upper plate 100.

As it will be appreciated by a person skilled in the art, the tilt mechanism 102 enables adjusting the tilt of the camera 30 mounted on the module 24. The term "tilt" as intended herein means the rotation of the camera about a vertical plate, whether frontwardly and backwardly (i.e. the pitch angle of the camera) or sidewardly (i.e. the roll angle of the camera). Further, a person skilled in the art will appreciate that the three-point configuration enables vertical movement of the upper plate 100 relative to the lower plate 98. As such, the term "tilt" as intended herein may also include "shift" or vertical movement of the upper plate 100 relative to the lower plate. It will be appreciated that this type of adjustment is often necessary since multiple sets of cameras and lenses tend not to be perfectly aligned even where their bases are. It will further be appreciated that rigs of the prior art that are devoid of such adjustment tend to require geometry corrections in post-production, which corrections are costly and reduce the image quality.

Figure 6:
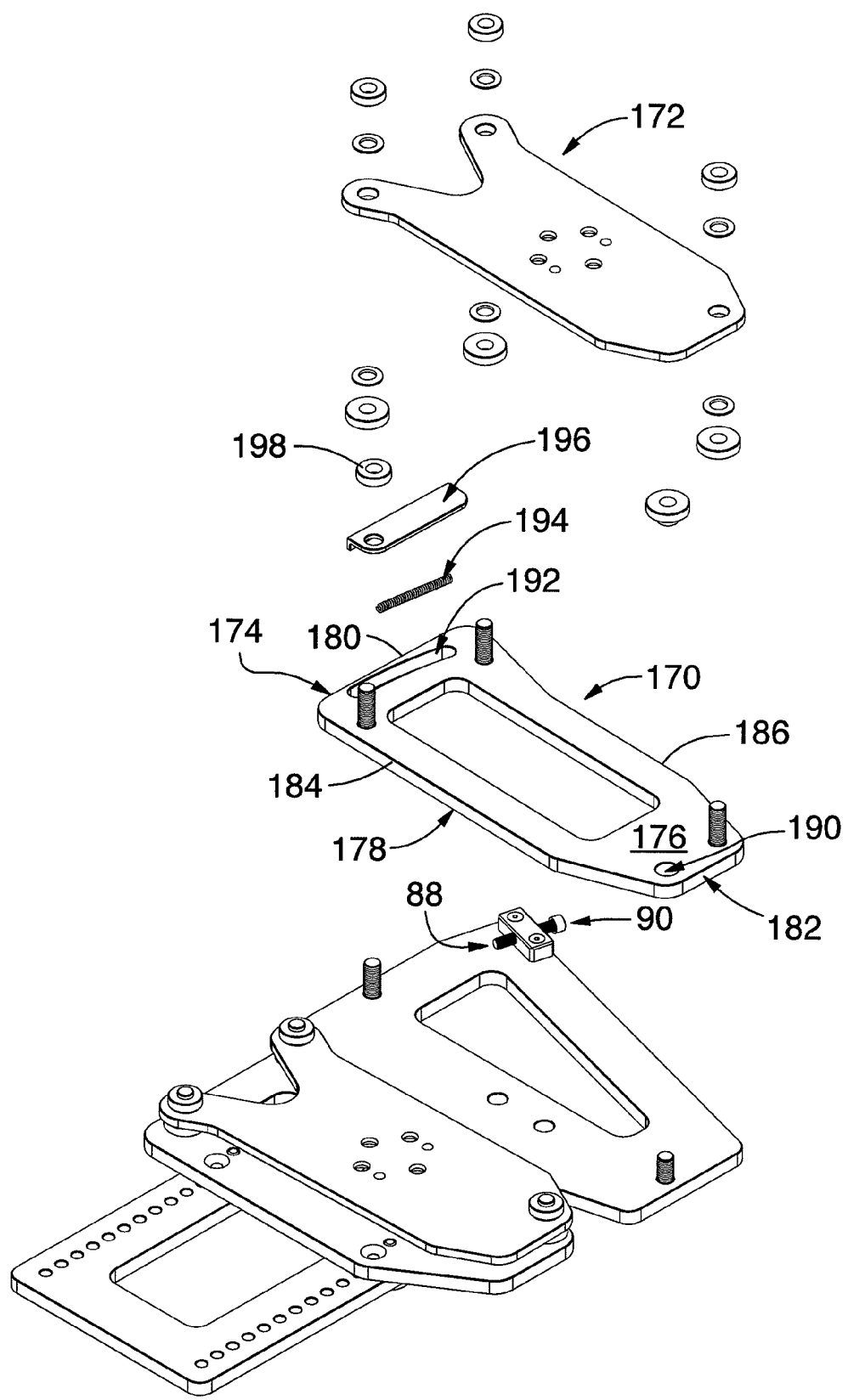
FIG. 6 is a front perspective view of the modular stereoscopic rig shown in FIG. 1, with the second, right module in exploded view.
Figure 7:
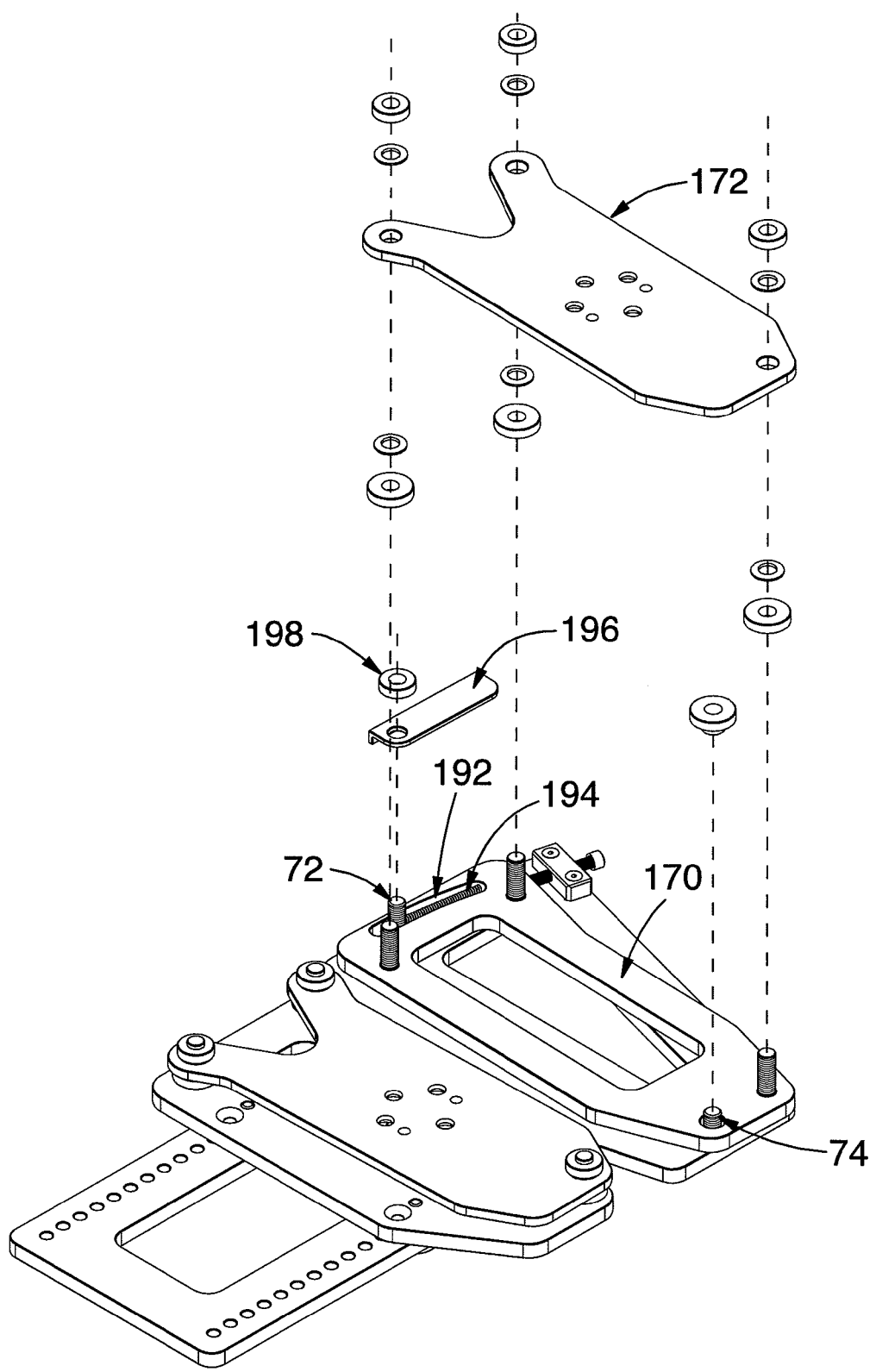
FIG. 7 is a front left perspective view of the base of the modular stereoscopic rig shown in FIG. 6, with the lower plate of the second, right module mounted to the base.

Now referring to FIGS. 6 and 7, the right module 26 will be described. As it will be appreciated by a person skilled in the art, the right module 26 shows some resemblance with the left module 24. As such, the right module 26 comprises a lower plate 170 and an upper plate 172 mounted to the lower plate 170 via a tilt mechanism 174.

The lower plate 170 comprises a top face 176, a bottom face 178, a back edge 180 and a front edge 182 extending therebetween. The lower plate 170 is also provided with side edges 184, 186 each comprising a straight portion and an angled portion, the angled portions converging toward one another to connect the front edge 182.

Similarly to lower plate 98, the lower plate 170 is provided with a rectangular opening 188 aimed at reducing the weight of the module 26. Mounted on the top face 176 of the lower plate 170 is the tilt mechanism 174. In one embodiment, the tilt mechanism 174 comprises a three (3) point adjustment screw system similar to the tilt mechanism 102 of the left module 24. As such, the tilt mechanism 174 does not require exhaustive description.

Proximal to junction of the front edge 182 and the left edge 178 thereof, the lower plate 170 is provided with a circular hole 190 extending between the top face 176 and the bottom face 178. The hole 190 is adapted for receiving therein the pivot pin 74 extending upwardly from the top face 38 of the base 22. As it will become apparent below, the pivot pin 74 and the hole 190 allows the right module 26 to pivot about the pivot pin 74 for adjusting the convergence angle between the cameras 28, 30.

At the back end 180 thereof, the lower plate 170 is provided with a gently curved slot 192 extending between the side edges 184, 186. The slot 192 is adapted for receiving therein the adjustment pin 72 extending upwardly from the top face 38 of the base 22 and to provide guiding means when the lower plate 170 is pivoted about the pivot pin 74, as it will become apparent below. Further, the slot 192 is adapted for receiving therein a resisting means such as a compressible spring 194 for providing resistance upon pivoting of the lower plate 170 relative to the base 22. In one embodiment, the slot 192 and the spring 194 accommodated therein are covered by a protective plate 196 and a mounting wheel 198.

The upper plate 172 is mounted on the tilt mechanism 174, sandwiched between the adjusting wheels 178a-178c and the lock wheels 180a-180c. In one embodiment, the upper plate 172 of the second module 26 is identical to the upper plate 100 of the first module 24. As such, a similar description also applies to upper plate 172, with proper adaptation.

Figure 8:
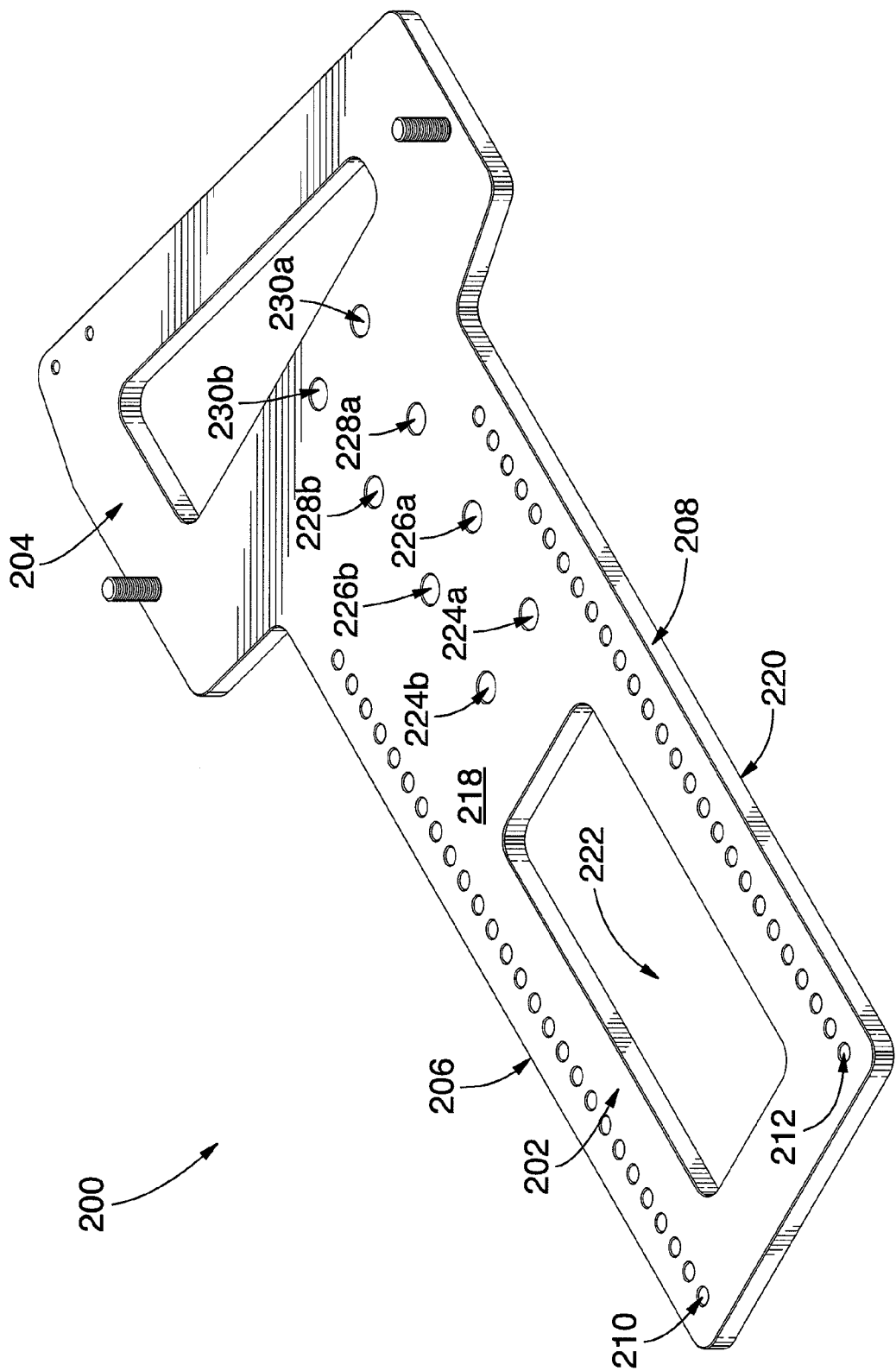
FIG. 8 is a front left perspective view of a base for a modular stereoscopic rig in accordance with one embodiment of the present invention.
Figure 9:
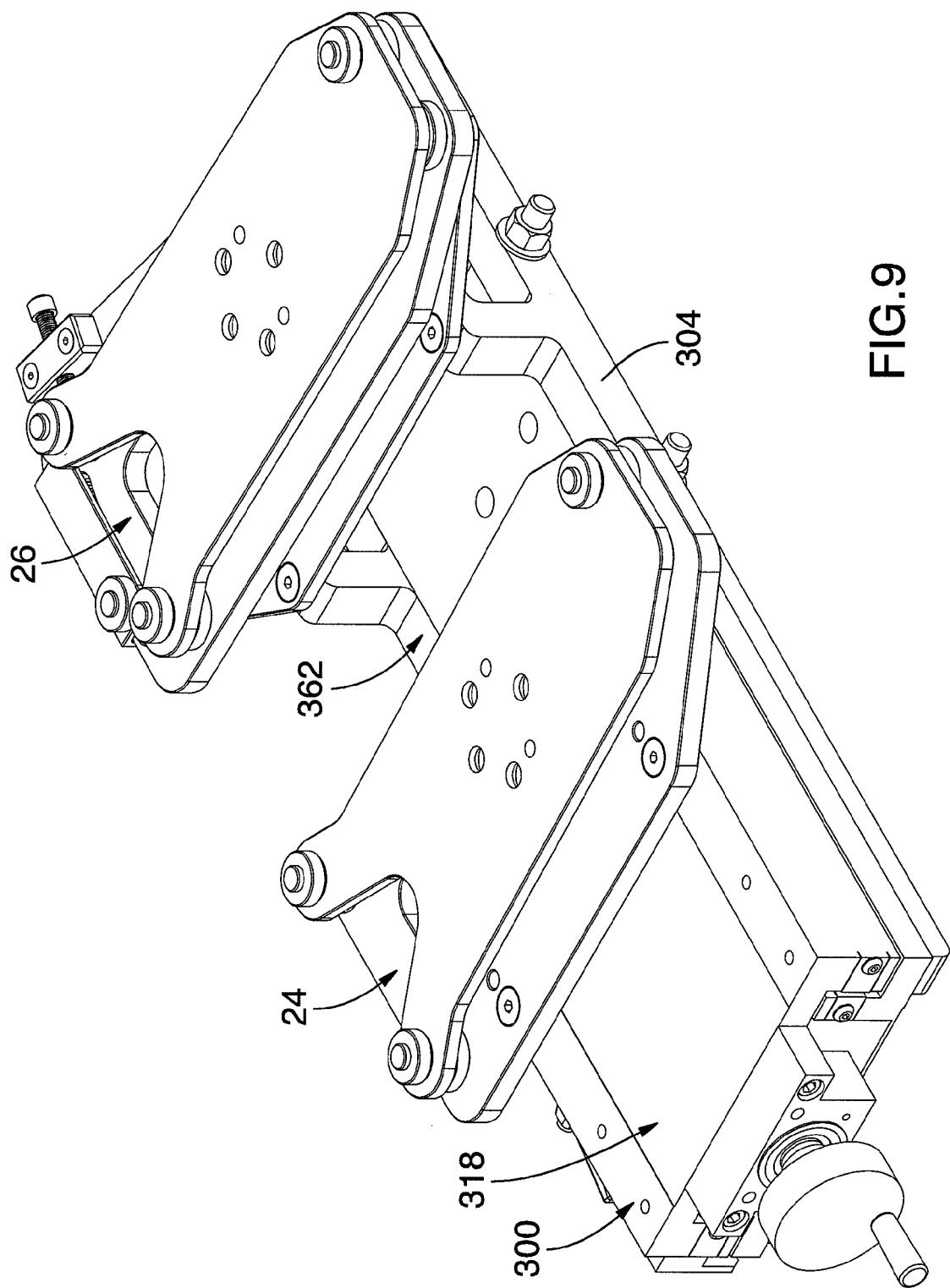
FIG. 9 is a front left perspective view of a modular stereoscopic rig in accordance with another embodiment of the present invention.
Figure 10:
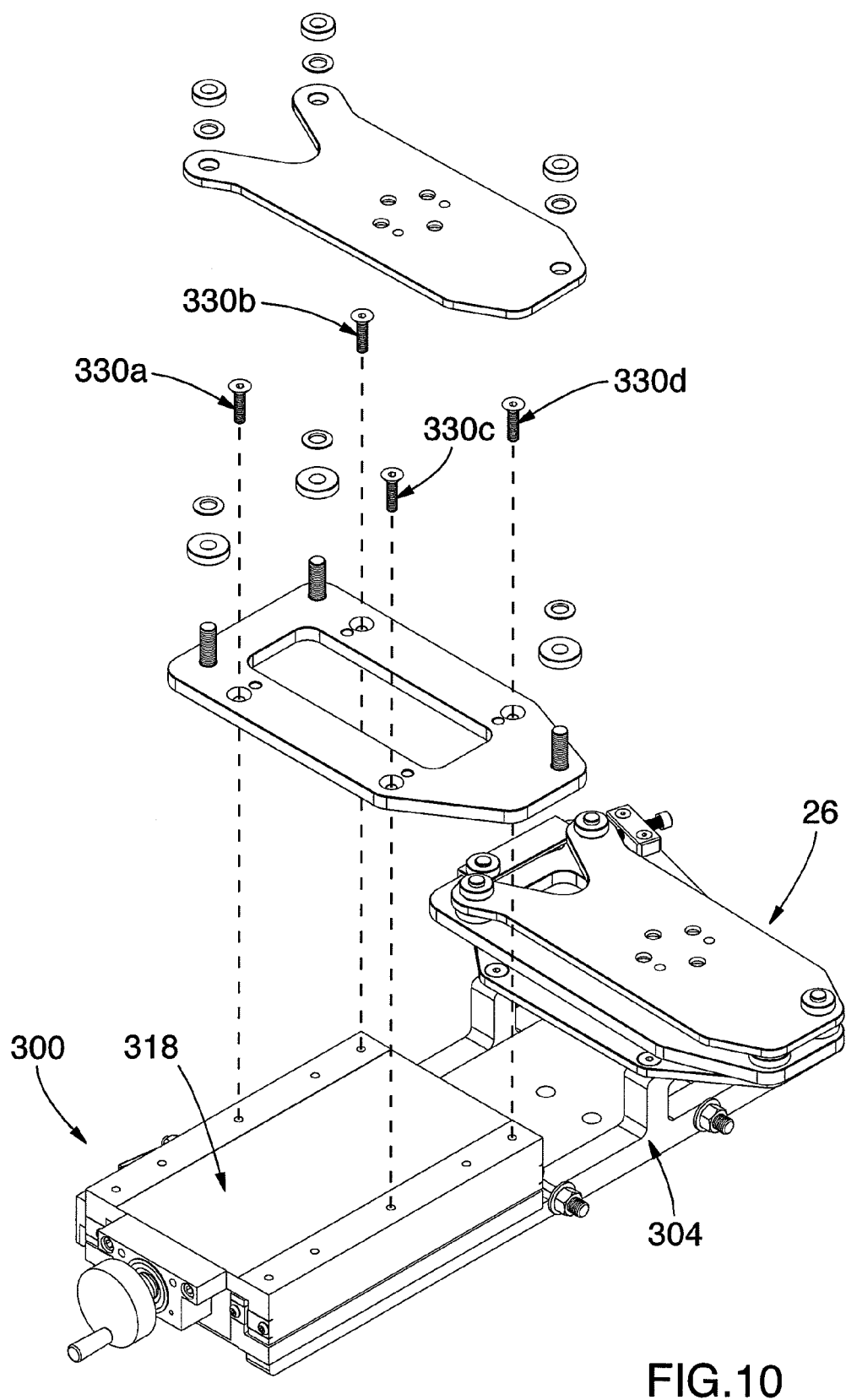
FIG. 10 is another front left perspective view of the modular stereoscopic rig shown in FIG. 9, with the first, left module in exploded view.
Figure 11:
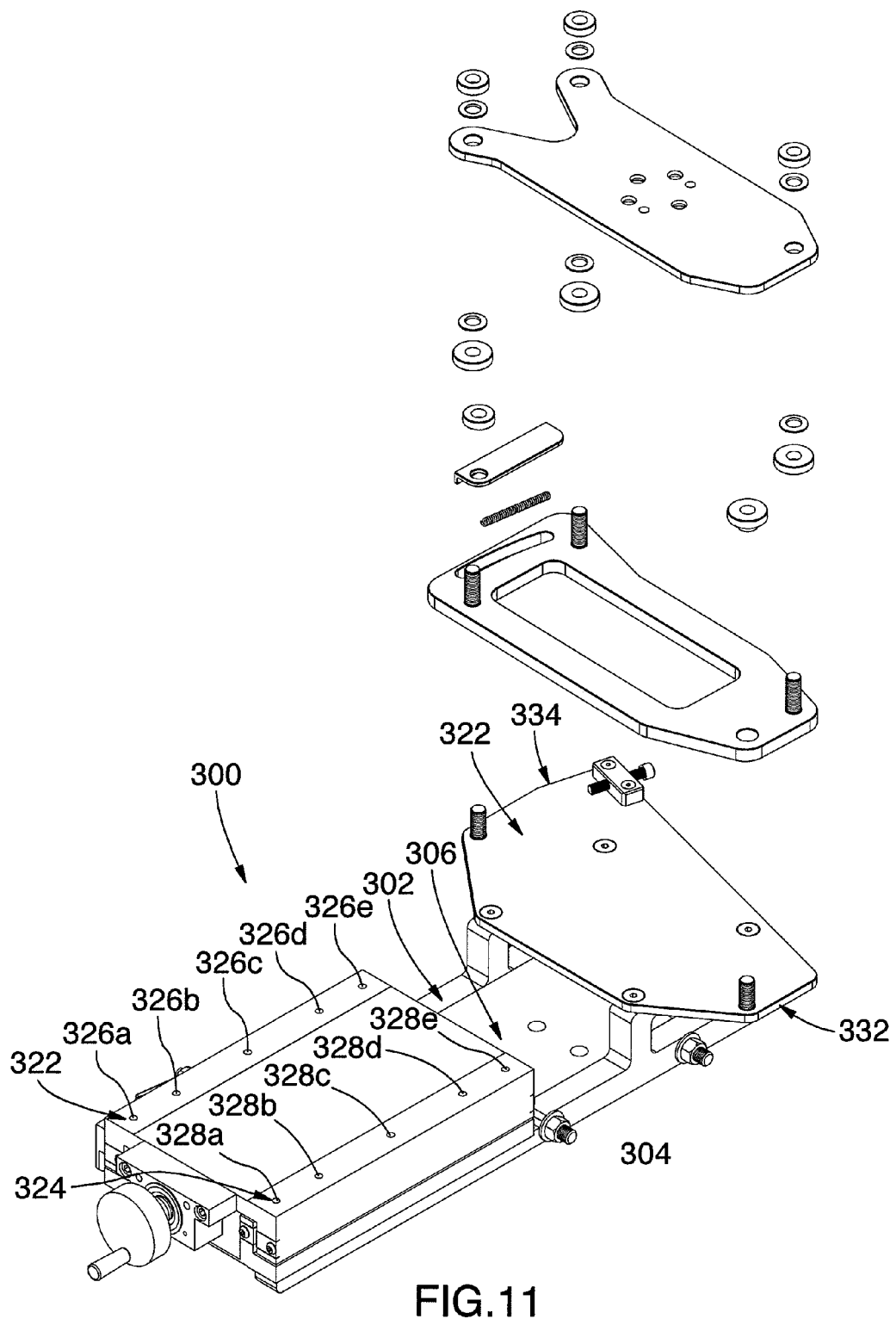
FIG. 11 is yet another front left perspective view of the modular stereoscopic rig shown in FIG. 9, with the first, left module removed and the second, right module in exploded view.

Once the right module 26 is mounted to the right portion 46 of the base 22, the pivot pin 74 engages the pivot hole 190 and the guiding pin 72 engages the slot 192. The left end 88 of the bolt 86 of the convergence adjustor 78 lies against the right edge 186 of the lower plate 170. As the bolt 86 is screwed in the block 80, it forces the back end 180 of the lower plate 170 to move towards the left (and thus the camera 30 mounted to the right module 26), therefore reducing the convergence angle between the first and second cameras 28, 30. At the opposite, when the bolt 86 is unscrewed, the compressible spring 194 tends to expand, thereby urging the back end 180 of the lower plate 170 (and thus of the camera 30 mounted to the right module 26) towards the right, thereby increasing the convergence angle between the cameras 28, 30.

Where creating 3D effects for objects or elements that are so distant to the camera that the required distance between the cameras is higher than the current rig allows, the use of a hyper-stereoscopic rig is required. Such a hyper-stereoscopic rig is shown in accordance with one embodiment of the present invention in FIG. 8, using reference numeral 200. In this embodiment, the base 200 is configured very similar to the rig 20 and comprises a left portion 202 and a right portion 204. While the right portion 202 of the rig 200 is merely identical to the right portion 46 of the rig 20, the left portion 202 slightly differs from the left portion 42 in that it is significantly longer.

The left portion 202 of the plate comprises a back edge 206, a front edge 208, a back row 210 of holes and a front row 212 of holes. In one embodiment, the back row 210 comprises twenty-seven (27) circular holes 214a-214aa distributed along the back edge 206. Similarly, the front row 212 comprises twenty-seven (27) circular holes 216a-216aa distributed along the front edge 208. In this embodiment, the holes 214a-214aa of the back row 210 are aligned with the corresponding holes 216a-216aa of the front row 212 (e.g. hole 214a of the back row 210 is aligned with hole 216a of the front row 212). A person skilled in the art will appreciated that the base 200 could be provided with a different number of holes in each row.

As it will become apparent below, the holes 214a-214aa and 216a-216aa extend between top and bottom faces 218, 220 of the base 200 and are adapted for receiving therein mating portions of the first, left camera mounting module 24, such as, for instance, fasteners 120a-120d.

Provided between the back and front rows 210, 212 is a rectangular void or opening 222. The opening 222 is aimed at reducing the overall weight of the base 200 for facilitating transport, installation and operation thereof, as lower weight rigs can use lighter camera support and allow for faster and more fluid movement of the cameras attached thereto.

For mounting the base 200 to a supporting member such as, for instance, a tripod (not shown), the base is provided with four (4) pairs of base supporting holes 224, 226, 228, 230. Similarly to rig 20, the configuration of the holes 224a-230b is adapted for allowing adjustable mounting of the base 200 to the support member (not shown), for preserving the balance of the rig 200 while the left and right modules 24, 26 are moved between the left and right ends of the base 200.

Now turning to FIGS. 9 to 12, a base 300 in accordance with yet another embodiment of the present invention will be described. In this embodiment, the base 300 is designed for dynamic interaxial variation (meaning a user change interaxial while filming and use a more precise interaxial value, unlike the holes configuration which uses quarter inch increments for interaxial and requires removal and manual displacement of the camera module) and comprises a pair of spaced-apart, back and front frame members 302, 304 connected to one another by a cross-member 306 and a pair of threaded fasteners 308a, 308b (i.e. bolts and nuts). In one embodiment, the cross-member 306 connecting the frame members is provided with a pair of threaded holes 310a, 310b for mounting the base 300 to a supporting member such as a tripod (not shown).

The frame members 302, 304 being merely identical, only the front frame member 304 will be described. A person skilled in the art will appreciate that a similar description also applies to the back frame member 302. The frame member 304 comprises a generally linear left portion 312 and a rectangular right portion 314 connected to the left portion 312 for defining together an elongated q-shaped structure. The left portion 312 comprises four (4) holes 316a-316d for mounting a linear positioning table or slide 318 on the frame members 302, 304. On the top of the right portion 314 are defined two threaded holes 320a, 320b for mounting a base plate 322 to the frame members 302, 304, as best described below.

Mounted on the left portions 312 of the frame members 302, 304 is the linear positioning table 318. In one embodiment, the linear positioning table 318 is manually operable. In a preferred embodiment, the linear positioning table 318 uses high-precision bearings and screws, to ensure the table 318 will not tilt, shift, bend or warp during translation, and to maintain a perfectly aligned image during this translation of the table 318. A person skilled in the art will appreciate that a motor-driven linear table may also be used. In such embodiment, the manual handle is removed and a precision actuator is coupled to the shaft of the table 318. In this embodiment, the positioning table 318 is provided with a two rows of holes 322, 324, each row comprising five holes 326a-326e and 328a-328e. Similarly to bases 22 and 200 described above, the holes 326a-326e of the first row 322 are aligned with corresponding holes 328a-328e of the second row 324 (e.g. hole 326a is aligned with hole 328a) for mounting the first module 24 to the linear positioning table 318 using bolts 330a-330d.

The base 300 further comprises the mounting plate 322 mounted on the right portions 314 of the frame members 302, 304. The mounting plate 322 is adapted for receiving thereon the second module 26. More specifically, the mounting plate 322 has the general shape of the right portions 46, 204 of the bases 22 and 200, with the exception that the mounting plate 322 is deprived of a triangular hole (e.g. hole 70). The mounting plate 322 comprises a front edge 332, a back edge 334, a top face 336 and a bottom face 338. Proximal to the front edge 332 is a pivot pin 340 extending upwardly from the top face 336. The position and the function of the pivot pin 340 are similar to those of the pivot pin 74 of the base 22. Proximal to the back edge 334 is an adjustment pin 342. The position and the function of the adjustment pin 342 are similar to those of the adjustment pin 72 of the base 22. The mounting plate 322 is further provided with a convergence adjustor 344 and with four beveled holes 346a-346d extending between the top and bottom faces 336, 338. The holes 346a-346d can be aligned with the holes 320a, 320b of the frame members 302, 304 and are configured for receiving therethrough bolts 348a-348d for mounting the plate to the right portion 314 of the frame.

As it will be apparent for a person skilled in the art, the bases 22, 200 and 300 are all configured for receiving thereon the same first and second modules 24, 26. This configuration of the bases 22, 200 and 300 allows rapid interchangeability of the first and second modules 24, 26 from one base to another 22, 200, 300 without specialty tools. Such interchangeability reduces machining costs, speed up manufacture, reduce the number of parts for transport to filming locations and to spread design improvements across all rigs faster which is of great advantage over the prior art. Further, the relatively simple construction of the various components (i.e. the first and second modules 24, 26 and the bases 22, 200 and 300) make the stereoscopic rig system of the present invention easy to manufacture and thus, very economical.

While various configurations have been described, a person skilled in the art will appreciate that numerous modifications are possible. For instance, the shape of the bases 22, 200 and 300 or of the modules could be different. Further, the three-point tilt mechanisms of the first and second modules could be replaced by other tilt mechanisms such as, for instance, micro-positioners. While in the embodiment described the rigs were provided with only one convergence adjustor associated with the second module, only the first module or both the first and second could be coupled to convergence adjustors. Further, numerous convergence adjustor configurations would be possible. For instance, the convergence adjustor could be driven by an electric actuator.

In one embodiment, the bases 22, 200 and 300 and the modules 24, 26 are made from a lightweight, rigid material such as aluminum or composite materials. A person skilled in the art will appreciate that any other suitable material may also be used.

Thus, although the foregoing description and accompanying drawings relate to specific preferred embodiments of the present invention as presently contemplated by the inventor, it will be understood that various changes, modifications and adaptations, may be made.

The invention claimed is:

1. A modular stereoscopic rig system comprising:
a first module for mounting a first camera thereto, said first module comprising a first corresponding coupling means;
a second module for mounting a second camera thereto, said second module comprising a second corresponding coupling means and a convergence angle adjusting means; and
a plurality of interchangeable bases, each of said interchangeable bases comprising:
a first side end;
a second, opposed, side end; and
a base coupling means provided on said base between said first and second side ends;
said base coupling means collaborating with said first and second coupling means for removably mounting said first module and said second module to said interchangeable bases;
said base coupling means further enabling adjustable positioning of said first and second modules relative to said first and second side ends of said interchangeable bases to adjust an interaxial distance between said first and second cameras; and
said convergence angle adjusting means enabling adjustment of a convergence angle between said first and second cameras mounted to said first and second modules.

2. The modular stereoscopic rig system of claim 1, wherein at least one of said first module and said second module comprises:

a base mounting member comprising a coupling means adapted to engage said base mounting means of said base;

a tilt adjusting means mounted on said base mounting member; and a camera coupling member mounted on said tilt adjusting means, said tilt adjusting means enabling tilt adjustment of said camera coupling member relative to said base mounting member.

3. The modular stereoscopic rig system of claim 2 wherein said tilt adjusting means comprises a three-point adjustment screw system.

4. The modular stereoscopic rig system of claim 1, further comprising a second convergence angle adjusting means, said second convergence angle adjusting means being operatively coupled to said first module.

5. A modular rig for a stereoscopic camera system, said modular rig comprising:

a base comprising a first side end, a second, opposed side end, and a base coupling means;

a first module for mounting a first camera thereto, said first module comprising a first coupling means engaging said base coupling means for removably mounting said first module to said base; and a second module for mounting a second camera thereto, said second module comprising a second coupling means and a convergence angle adjusting means, said second coupling means engaging said base coupling means for removably mounting said second module to said base;

Wherein said base coupling means enables adjustable positioning of said first and second modules relative to said first and second side ends of said base to adjust an interaxial distance between said first and second cameras and said convergence angle adjusting means enabling adjustment of a convergence angle between said first and second cameras mounted to said first and second modules.

6. The modular rig of claim 5, further comprising a second convergence angle adjusting means, said second convergence angle adjusting means being operatively coupled to said first module.

7. The modular rig of claim 5, wherein at least one of said first module and said second module comprises:

a base mounting member comprising a coupling means adapted to engage said base mounting means of said base;

a tilt adjusting means mounted on said base mounting member; and a camera coupling member mounted on said tilt adjusting means, said tilt adjusting means enabling tilt adjustment of said camera coupling member relative to said base mounting member.

8. The modular rig of claim 7, wherein said tilt adjusting means comprises a three-point adjustment screw system.

* * * * *